(12) United States Patent
Burrow et al.

(10) Patent No.: US 8,960,724 B2
(45) Date of Patent: Feb. 24, 2015

(54) CONTROLLED PRESSURE RELEASE FOR SEATBELT PRETENSIONING DEVICES

(71) Applicant: Autoliv ASP, Inc., Ogden, UT (US)

(72) Inventors: Jon E. Burrow, Ortonville, MI (US);
Bin Wang, Orion Township, MI (US);
Kurt W. Schulz, Dryden, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/833,084

(22) Filed: Mar. 15, 2013

(65) Prior Publication Data

US 2014/0265289 A1 Sep. 18, 2014

(51) Int. Cl.
*B60R 22/46* (2006.01)
*F15B 15/02* (2006.01)
*B60R 22/195* (2006.01)
*B60R 21/01* (2006.01)

(52) U.S. Cl.
CPC ......... *B60R 22/1954* (2013.01); *B60R 22/1955* (2013.01); *B60R 22/1952* (2013.01); *B60R 2021/01272* (2013.01); *B60R 22/4633* (2013.01); *B60R 22/4619* (2013.01); *B60R 2022/4661* (2013.01)
USPC .......................... 280/806; 297/480; 242/379.2

(58) Field of Classification Search
CPC ............ B60R 22/4633; B60R 22/4628; B60R 22/4619; B60R 22/46; B60R 22/1952; B60R 22/1955; B60R 2022/4661; B60R 2021/01272; F15B 15/19
USPC ............... 280/806, 807, 801.1; 297/480, 475, 297/474; 242/379, 379.2; 102/530; 701/45
See application file for complete search history.

(56) References Cited

U.S. PATENT DOCUMENTS

| | | | |
|---|---|---|---|
| 5,842,344 A * | 12/1998 | Schmid | 60/632 |
| 6,363,722 B1 * | 4/2002 | Takehara et al. | 60/632 |
| 6,616,186 B1 | 9/2003 | Midorikawa et al. | |
| 7,370,721 B2 | 5/2008 | Zelmer et al. | |
| 7,624,833 B2 | 12/2009 | Gillet | |
| 7,643,920 B2 | 1/2010 | Gillet | |
| 7,735,871 B2 | 6/2010 | Schmidt et al. | |
| 7,823,924 B2 | 11/2010 | Dewey et al. | |
| 7,862,081 B2 * | 1/2011 | Thomas | 280/733 |
| 7,963,473 B2 | 6/2011 | Clute | |
| 7,988,084 B2 | 8/2011 | Lombarte et al. | |
| 8,042,758 B2 | 10/2011 | Choi et al. | |

* cited by examiner

*Primary Examiner* — Keith Frisby
(74) *Attorney, Agent, or Firm* — Madison IP, P.C.

(57) ABSTRACT

The seatbelt pretensioner, which is designed for reducing slack in seatbelt webbing upon deployment in response to a triggering event, comprises an igniter that generates gas in response to the triggering event, an elongate body defining a chamber for receiving and the confining gas generated by the igniter, a piston movable within the elongate body by the gas generated, a slack-reducing assembly that responds to movement of the piston and is connected to at least a portion of seatbelt webbing, movement of the piston causes the slack-reducing assembly to move the seat belt webbing reducing slack in the seatbelt webbing; and a controlled pressure release that enables gas to escape from the elongate body after deployment, relieving gas pressure within the pretensioner. The controlled pressure release may comprise one or more of various pressure relieving features such as a porous intermediate disposed between the vent hole and the gas within the elongate body, a piston having a porous portion and/or a safety valve, and one or more plugs that seal vent holes in the elongate body that become unsealed by loosening the pretensioning assembly.

10 Claims, 5 Drawing Sheets

CONTROLLED PRESSURE RELEASE FOR SEATBELT PRETENSIONING DEVICES

BACKGROUND OF THE INVENTION

1. Field of the Invention

The present invention relates generally to seatbelt restraint systems for vehicles and, more particularly, to a seatbelt pretensioner for a seatbelt restraint system in a vehicle.

2. Background

Seatbelt restraint systems for restraining an occupant in a vehicle seat play an important role in vehicle crash situations. Seat restraint systems commonly have a lap belt section and a shoulder belt section. In general, the lap belt section and the shoulder belt section are connected together at one end. A seat restraint system includes a buckle at the connected end. The seat restraint system also includes a latch plate connected at one end by seatbelt webbing that is attached to the vehicle structure and/or the seat. The buckle receives the latch plate to be buckled together. When the buckle and the latch plate are buckled together, the seat restraint system restrains movement of the occupant during a collision.

OEM vehicle manufacturers often incorporate pretensioning devices, which tension the seatbelt prior to full impact of a vehicle, to enhance restraining the occupant to the seat. One type of pretensioning device is a pyrotechnic lap pretensioner (PLP). Various designs are known, including a type of PLP which uses a cable to connect a piston at one end to seatbelt webbing at the other end. When a collision occurs, a pyrotechnic charge is fired, producing gas which pressurizes a gas chamber within a tube, to force the piston down the tube. Since the seatbelt webbing is ultimately connected to the piston via the cable, the seatbelt moves in conjunction with the piston, tightening the belt around the occupant.

Many conventional seatbelt retractors employ a pretensioner for forcedly winding seatbelt webbing on a spindle upon abrupt deceleration of a vehicle due to collision to prevent the seatbelt webbing from being loosened. A number of conventional seatbelt retractors are identified and described in U.S. Pat. No. 8,042,758, the content of this patent is incorporated herein by this reference.

Once deployed, most pretensioners retain pressurized gas within the interior of the tube. This pent up pressurized gas presents a risk of personal injury during disassembly.

BRIEF SUMMARY OF THE INVENTION

According to teachings of the present disclosure, a seatbelt pretensioner that reduces slack in seatbelt webbing better secures an occupant within a vehicle. Upon deployment in response to a triggering event, a slack-reducing assembly draws the seatbelt webbing taut about the occupant. When a collision occurs, a pyrotechnic charge is fired within the slack-reducing assembly, producing gas which pressurizes a gas chamber within an elongate body (such as a tube), to force a piston to move within the elongate body. Since the seatbelt webbing is connected to the piston in some suitable manner such as via a cable or a chain of balls, the seatbelt moves in conjunction with the piston, tightening the belt around the occupant.

After deployment, a controlled pressure release enables gas to escape from the seatbelt pretensioner, relieving gas pressure within the pretensioner. Embodiments of the seatbelt pretensioner of this disclosure comprise an igniter that generates gas in response to the triggering event, an elongate body defining a chamber for receiving and the confining gas generated by the igniter, a piston movable within the elongate body by the gas generated, and a slack-reducing assembly that responds to movement of the piston and is connected to at least a portion of seatbelt webbing so that movement of the piston causes the slack-reducing assembly to move the seatbelt webbing reducing slack in the seatbelt webbing. Thereafter, the controlled pressure release causes gas pressure to dissipate within the pretensioner.

This dissipation of the gas pressure after deployment can occur in several ways, and the various embodiments of the seatbelt pretensioner of the present disclosure facilitate this dissipation of gas pressure. Beginning immediately after deployment, some embodiments provide for a gradual escape of gas to relieve pressure within the seatbelt pretensioner. Other embodiments provide for the controlled release of gas to reduce pressure within the seatbelt pretensioner during disassembly long after deployment. Still other embodiments may implement the controlled release of gas through both the gradual escape of gas and the release during disassembly.

In some embodiments, the controlled pressure release comprises a vent hole in the elongate body and a porous intermediate disposed between the vent hole and the gas within the elongate body. The porous intermediate may comprise a porous ring disposed abutting an internal surface of the elongate body. The porous ring can be press fit into the elongate body so that is disposed next to the vent hole. After the piston has moved within the elongate body in response to the triggering event, the pressurized gas within the elongate body is exposed to the porous ring. Then, the pressurized gas can bleed through the porous ring and escape through the vent hole to relieve pressure within the elongate body.

In some embodiments a portion of the piston is porous so that as the pressurized gas is exposed to the piston, not only does the gas drive the piston within the elongate body, but it will also bleed through the porous portion to exit through the vent hole both during the movement of the piston and after full deployment of the piston. The piston of at least one embodiment has an overmold at least partially surrounding the porous portion. Additionally, some embodiments may have a piston that has a safety valve that releases gas for venting from the elongate body when the pressure of the gas generated exceeds the pressure required to move the piston to its full extent.

In some embodiments, the controlled pressure release utilizes a vent hole and a plug that seals the vent hole. After deployment, the plug can be refracted from the vent hole to unseal the vent hole during disassembly of the pretensioner.

The seatbelt pretensioner can comprise an assembly of a cover, a guide plate, an elongate body or tube, and a frame. Before deployment, the assembly is held tightly together. The vent hole or vent holes can be disposed so that a plug on the guide plate, the frame, or on a sealing member (captured between the elongate body and the guide plate or the frame) to align with and seal the vent hole or holes until after deployment when the assembly is disassembled. To unseal the vent hole or vent holes, the assembly loosened only enough to release gas through the unsealed vent hole(s) and not to permit any of the component parts of the assembly to become projectiles propelled by the escaping gas.

It should be understood that one or more of these controlled pressure release features can be used in an embodiment of the seatbelt pretensioner. A skilled artisan will know or can easily determine what combination of controlled pressure release features will be the most cost effective and will safely release the pressure in the seatbelt pretensioner.

In operation, the seatbelt pretensioner of the various embodiments disclosed herein can retract the seatbelt webbing in response to a deployment event and release gas pressure created by the deployment of the seatbelt pretensioner. When a deployment event (such as a collision) occurs, the deployment event is sensed and the igniter is actuated to generate gas that produces gas pressure within the elongate body. This gas pressure moves the piston within the elongate body, and because the seatbelt webbing is connected to the piston any slack in the webbing is reduced by retracting the seatbelt webbing caused by the movement of the piston. Depending upon which controlled pressure release features are employed in the seatbelt pretensioner, gas pressure relief within the seatbelt pretensioner occurs during and/or after deployment by allowing gas to escape through the vent hole (s) or through an over-molded or cast piston.

If the seatbelt pretensioner has a porous intermediate disposed between the vent hole and the generated gas, then relieving gas pressure occurs by dissipating gas pressure by enabling gas to pass through the porous intermediate and then through the vent hole(s). If the piston has a porous portion, then relieving gas pressure occurs by dissipating gas pressure by enabling gas to pass through the porous portion and then through to the non-pressure side of the elongate body. If the piston further comprises a safety valve, then relieving gas pressure occurs by releasing gas through the safety valve for venting from the elongate body when the pressure of the gas generated exceeds the pressure required to move the piston to its full extent.

During disassembly after deployment, any pent up gas pressure can be relieved by loosening the pretensioner assembly sufficiently to release the plug(s) from the vent hole(s) so that gas is allowed to escape through the vent hole(s).

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof which are illustrated in the appended drawings. Understanding that these drawings depict only typical embodiments and are not therefore to be considered to be limiting of scope thereof, the present disclosure describes and explains various exemplary embodiments with additional specificity and detail through the use of the accompanying drawings in which.

DETAILED DESCRIPTION OF THE INVENTION

The exemplary embodiments of the present disclosure will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of embodiments, as represented in FIGS. 1-9, is not intended to limit the scope of the invention, as claimed, but is merely representative of exemplary embodiments of the invention.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

In this application, the phrases "connected to", "coupled to", and "in communication with" refer to any form of interaction between two or more entities, including mechanical, electrical, magnetic, electromagnetic, pneumatic, and thermal interactions.

The phrases "attached to", "secured to", and "mounted to" refer to a form of mechanical coupling that restricts relative translation or rotation between the attached, secured, or mounted object, respectively. The phrases "pivotally attached to" and "slidably attached to" refer to forms of mechanical coupling that permit relative rotation or relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when developed attached directly to each other from a single work piece. Thus, elements that are "coupled to" each other may be formed together as a single piece.

Figure 1:
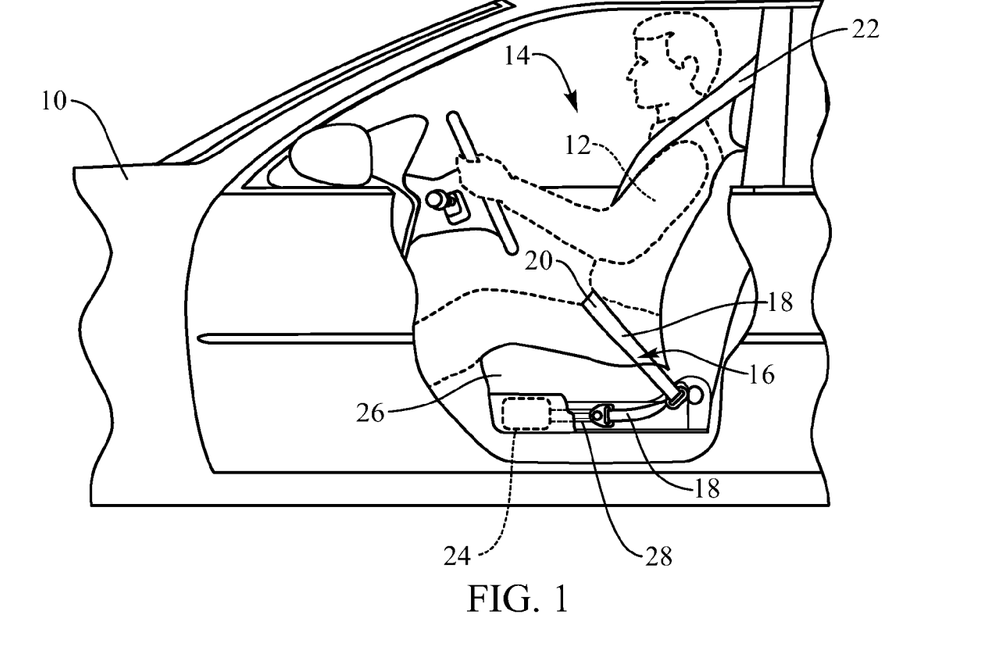
FIG. 1 is a partial cutaway view of a vehicle showing an occupant wearing a seatbelt restraint.

FIG. 1 is a partial cutaway view of a vehicle 10 showing an occupant 12 (in phantom lines) seated within the vehicle's interior space 14 and wearing a seatbelt restraint 16. The seatbelt restraint 16 is of a type commonly known that has seatbelt webbing 18 configured into a lap restraint portion 20 and a shoulder restraint portion 22 that is latched using a slide-in clasp (not shown). A seatbelt pretensioner assembly 24, generally designated by a box in phantom lines, is disposed in the seat 26 upon which the occupant 12 is sitting. The seatbelt pretensioner assembly 24 is connected via a cable 28 or any other suitable connection to the seatbelt webbing 18, provided the connection causes the retraction of the seatbelt webbing 18 in response to a deployment event. It should be understood that the location of the seatbelt pretensioner assembly 24 is a matter of design choice so long as the seatbelt pretensioner assembly 24 can retract the seat belt in response to a deployment event. Hence, the seatbelt pretensioner assembly 24 can be located in the seat 26, in the seat back, underneath the seat 26, or any other suitable location.

When a collision occurs, as will be discussed in more detail below, a pyrotechnic charge is fired, producing gas which pressurizes a gas chamber within a tube (such as an elongate body), to force a piston down the tube. Because the seatbelt webbing 18 is connected to the piston via the cable 28, the seatbelt webbing 18 moves in conjunction with the piston, tightening the belt around the occupant 12.

Figure 2:
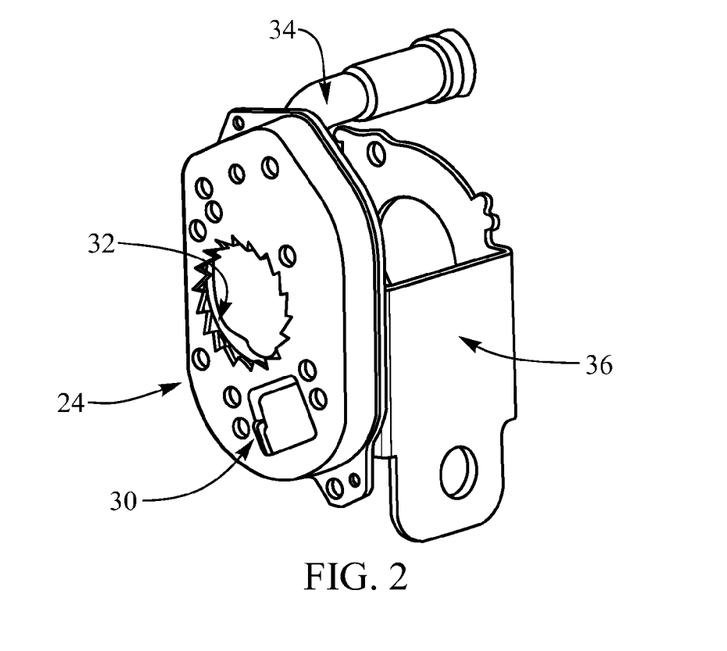
FIG. 2 is a perspective view of an exemplary seatbelt pretensioner assembly showing the pretensioner cover secured to the frame.
Figure 3:
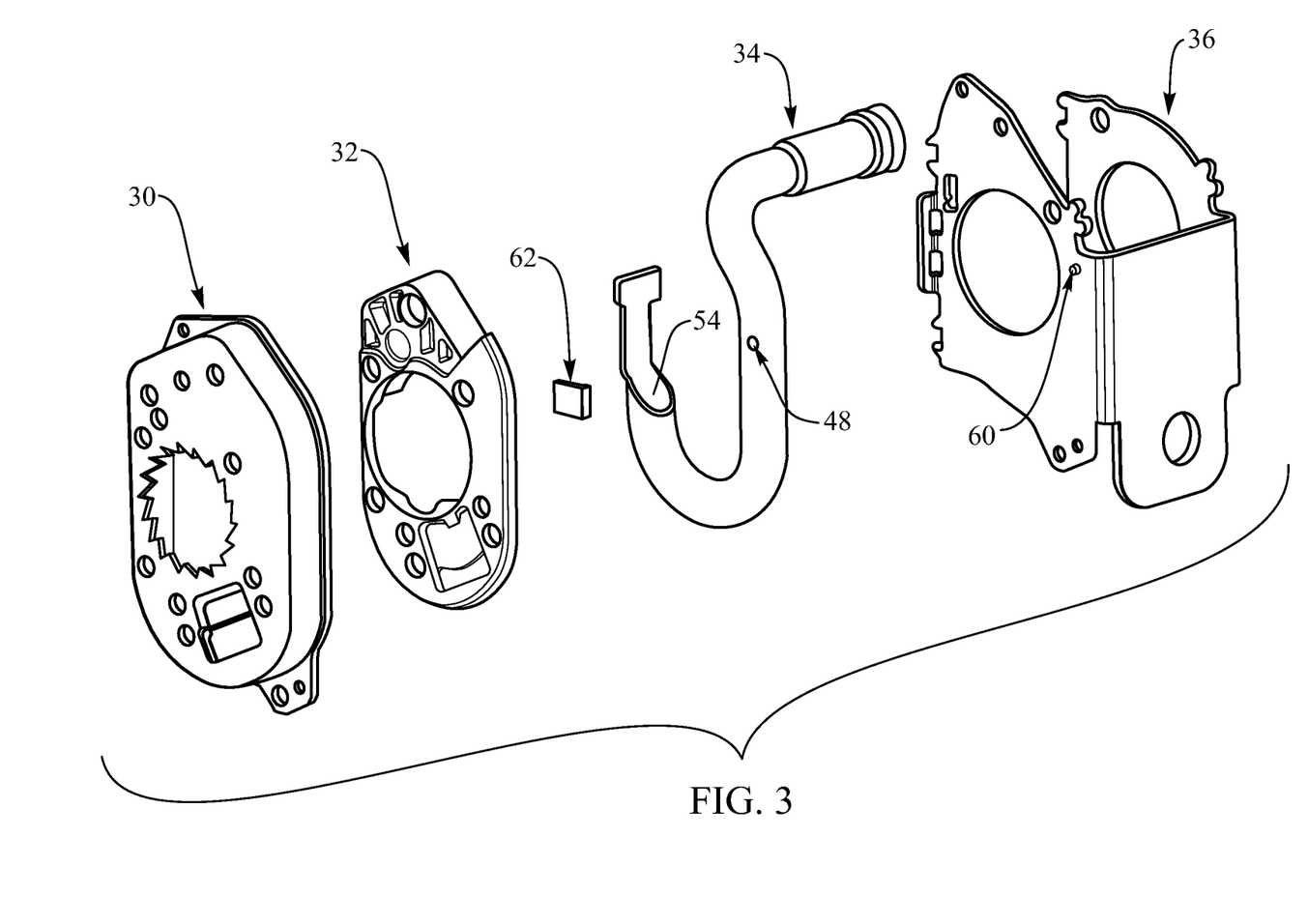
FIG. 3 is an exploded perspective view of the various components of an exemplary seatbelt pretensioner assembly.

The seatbelt pretensioner assembly 24, as generally and best shown in FIGS. 2 and 3, comprises a pretensioner cover 30, a guide plate 32, an elongate body or tube 34, and a frame 36. Before deployment, the seatbelt pretensioner assembly 24 is held tightly together by securing the pretensioner cover 30 to the frame 36 (sometimes referred to as a retractor frame) and capturing therebetween the guide plate 32 and the elongate body 34.

Figure 4:
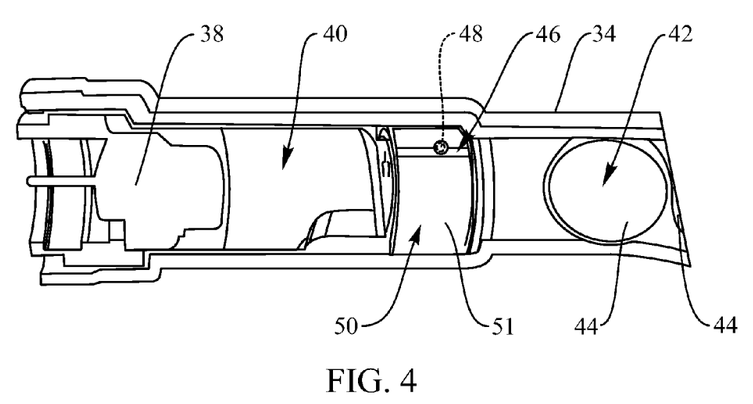
FIG. 4 is a sectional view of a portion of an exemplary elongate body showing a porous ring disposed adjacent to a vent hole in the elongate body.

FIG. 4 is a sectional view of a portion of an exemplary elongate body 34. Within the elongate body 34 is an igniter 38 that generates gas to create gas pressure within a chamber 40 in the elongate body 34 in response to a triggering event, such as a collision. This gas pressure forces a piston 42 and/or a series of pretension balls 44 (the pretension ball 44 closest to the igniter 38 is sometimes referred to as the piston) to move away from the igniter 38 down the interior of the elongate body 34 and to cause the retraction of the seatbelt webbing 18. Because the seatbelt webbing 18 is connected to the piston 42 via the cable 28, the seatbelt webbing 18 moves in conjunction with the piston 42, tightening the seatbelt restraint 16 around the occupant 12. A seatbelt pretensioning device that utilizes pretension balls is disclosed in U.S. Pat. No. 7,988,084, and is expressly incorporated herein by this reference.

In particular, FIG. 4 illustrates an exemplary embodiment of the elongate body 34 that utilizes a series of pretensioner balls 44 with the closest of the balls 44 being considered the piston 42. The controlled venting of the pressurized gas in the chamber 40 is accomplished by a controlled pressure release 46 comprising one or more vent holes 48 in the wall of the elongate body 34 and a porous intermediary 50 disposed over the vent hole(s) 48. Once the pretensioning event has concluded, the porous intermediary 50 allows the pressurized gas to vent through the vent hole(s) 48 in a controlled manner. In FIG. 4, the porous intermediary 50 is a porous ring 51 that can be press fit into the interior of the elongate body 34, and can be made of any suitable material, such as sintered/powdered metal or hard packed metal mesh, so long as the material allows for the controlled venting of the pressurized gas after deployment. It should be understood, that the porous intermediary 50 can take on any suitable form and need not necessarily be a porous ring 51, so long as the porous intermediary is disposed between the generated gas and the vent hole(s) 48 or the exterior space outside the vent hole(s). For example, it could be one or more porous mats disposed over the vent hole(s) 48 or one or more porous plugs that are disposed within the vent hole(s) 48. Certainly one of skill in the art, armed with this disclosure will be able to use various forms of porous intermediaries 50.

Without the controlled pressure release 46, pressure can remain inside the seatbelt pretensioning device for an extended period of time after deployment of the device. This pent up pressure presents a risk of personal injury during disassembly which occurs when the spent seatbelt pretensioning device is replaced with a new pretensioning device after a deployment.

Figure 5:
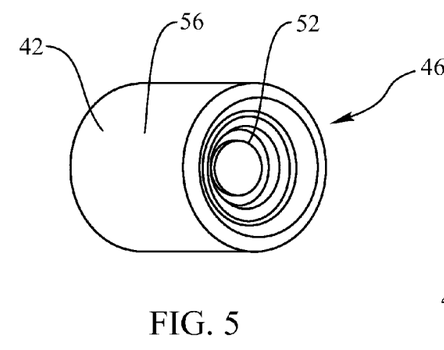
FIG. 5 is a perspective view of an exemplary piston with a porous portion and an over-molded/cast portion.

Whether or not a porous intermediary 50 is used to allow the controlled release of gas pressure through the vent hole(s) 48, other controlled pressure releases 46 are contemplated by this disclosure and are disclosed herein. FIG. 5 illustrates another exemplary controlled pressure release 46 in the form of a piston 42 at least a portion of which is made of a porous material 52. With this embodiment, the gas pressure created upon actuation of the igniter 38 will force the piston 42 down the elongate body 34 with sufficient force to trigger the retraction of the seatbelt webbing 18, but once downstream movement stops, gas is allowed to vent through the porous material 52 either out an open end 54 of the elongate body 34 or through vent hole(s) 48 in the elongate body 34 downstream of the resting place of the piston 42. For structural integrity and for a snug fit within the elongate body 34, the piston 42 can have an over-molded seal 56 surrounding the porous material 52. Although the piston 42 can be over-molded, it can be cast or otherwise formed to provide structural integrity and a snug fit within the elongate body 34 and still have a porous material 52.

Figure 6:
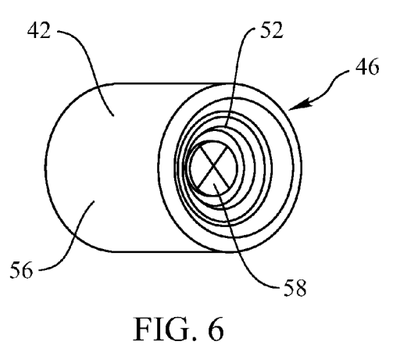
FIG. 6 is a perspective view of an exemplary piston with a safety valve.

FIG. 6 illustrates yet another exemplary controlled pressure release 46 in the form of a piston 42. The piston 42 of FIG. 6, in addition to the porous material 52 and the over-molded seal 56, has a safety valve 58 disposed within the porous material 52. The safety valve 58 releases gas for venting from the elongate body 34 when the pressure of the gas generated exceeds the pressure required to move the piston 42 to its full extent down the elongate body 34. Hence, to relieve pressure on the piston 42 during deployment, excess gas pressure is allowed to pass through the safety valve 58 to vent out of the elongate body 34 while not inhibiting the movement of the piston 42 to the full extent required for retracting the seatbelt webbing 18.

Figure 7:
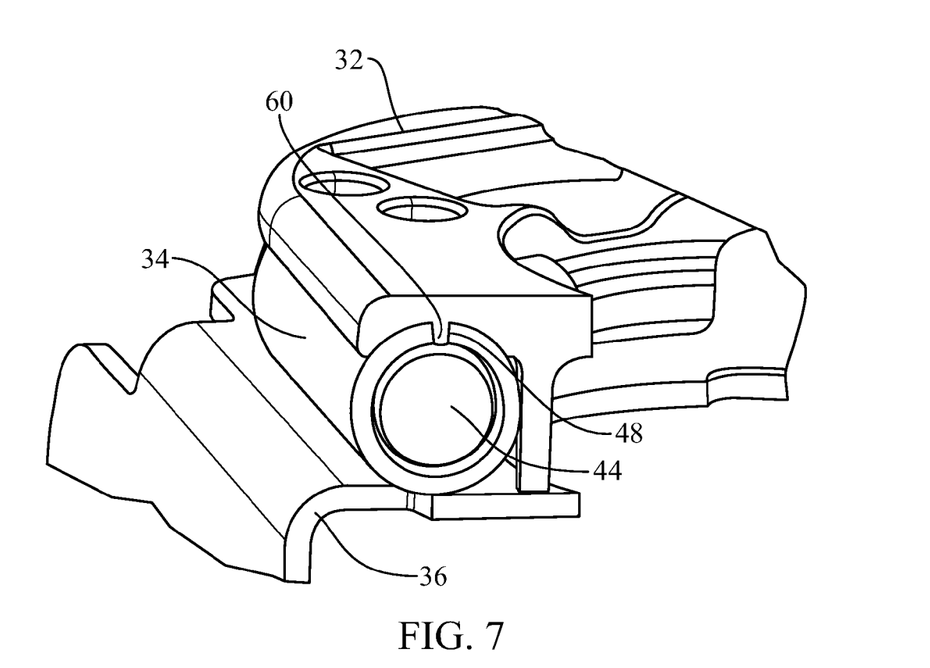
FIG. 7 is a transverse section view of a portion of an exemplary seatbelt pretensioner assembly with the pretentioner cover removed so not to obscure features and showing a sealing plug raised from a guide plate to seal a vent hole in the elongate body.
Figure 8:
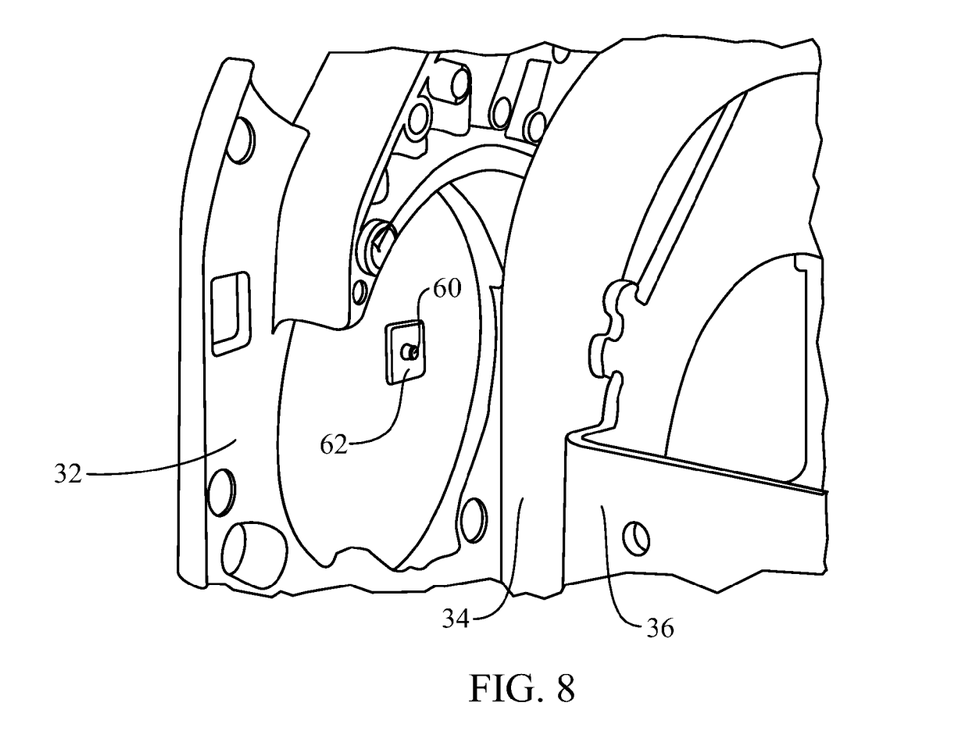
FIG. 8 is an exploded view of a portion of an exemplary seatbelt pretensioner assembly with the pretentioner cover removed so not to obscure features and showing the sealing member exploded from sealing engagement with a vent hole in the elongate body.
Figure 9:
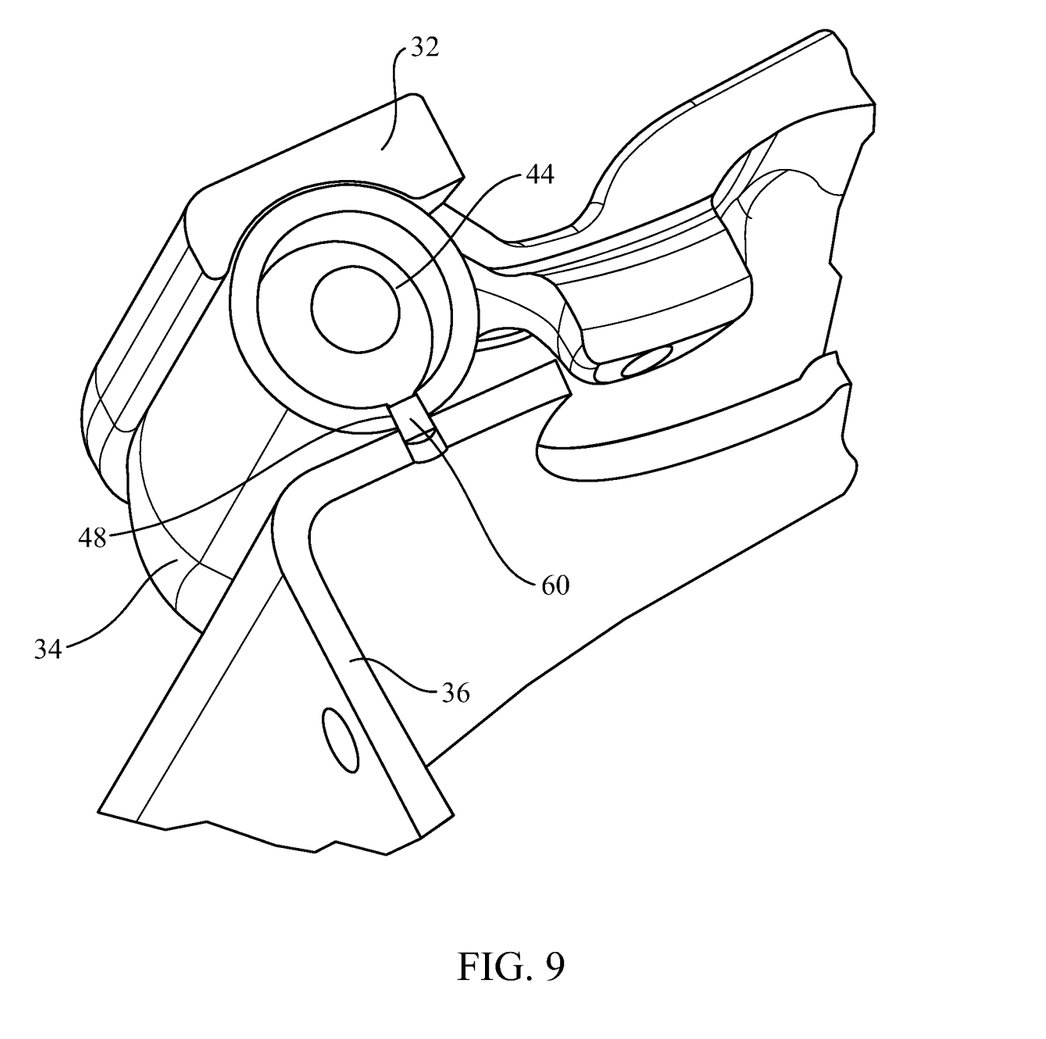
FIG. 9 is a transverse section view of a portion of an exemplary seatbelt pretensioner assembly with the pretentioner cover removed so not to obscure features and showing a sealing plug raised from a frame to seal a vent hole in the elongate body.

FIGS. 7-9 illustrate various controlled pressure releases 46 that are designed to relieve any pent up gas pressure within the elongate body 34 during disassembly of the seatbelt pretensioner assembly 24 a period of time after deployment. Once deployed, a pretensioner may retain pressurized gas within the interior of the elongate body 34. This pent up pressurized gas presents a risk of personal injury during disassembly unless the pressure can be released in a controlled manner.

FIG. 7 is a transverse section view of a portion of an exemplary seatbelt pretensioner assembly 24 with the pretensioner cover 30 removed so not to obscure features and showing a sealing plug 60 raised from a guide plate 32 to seal a vent hole 48 in the elongate body 34. Before and during deployment of the pretensioner, the pretensioner cover 30 is tightly secured to the frame 36, capturing the guide plate 32 and elongate body 34 therebetween in a sandwiching engagement. FIG. 7 illustrates a sealing plug 60 raised from the inside surface of the guide plate 32 to align with and engage to seal a vent hole 48 in the elongate body 34. Before and during deployment no appreciable amount of gas can pass from the interior of the elongate body 34. However, after deployment of the pretensioner, frequently the seatbelt pretensioner assembly 24 must be replaced and/or recycled. This often requires disassembly of the seatbelt pretensioner assembly 24. If there is pent up gas pressure within the elongate body 34, this pressure can be relieved by loosening the pretensioner cover 30 and allowing the sealing plug 60 to dislodge from the vent hole 48 to permit gas to escape through the vent hole 48, reducing the gas pressure. Once the gas pressure is relieved, the disassembly can be completed without risk of personal injury.

Similar to FIG. 7, FIG. 9 is a transverse section view of a portion of an exemplary seatbelt pretensioner assembly 24 with the pretensioner cover 30 removed so not to obscure features and showing a sealing plug 60 raised from a frame 36 to seal a vent hole 48 in the elongate body 34. Again, before and during deployment of the pretensioner, the pretensioner cover 30 is tightly secured to the frame 36, capturing the guide plate 32 and elongate body 34 therebetween in a sandwiching engagement. FIG. 9 illustrates a sealing plug 60 raised from the inside surface of the frame 36 to align with and engage to seal a vent hole 48 in the elongate body 34. Before and during deployment no appreciable amount of gas can pass from the interior of the elongate body 34. However, after deployment of the pretensioner, frequently the seatbelt pretensioner assembly 24 must be replaced and/or recycled, which often requires disassembly of the seatbelt pretensioner assembly 24. If there is pent up gas pressure within the elongate body 34, this pressure can be relieved by loosening the pretensioner cover 30 and allowing the sealing plug 60 to dislodge from the vent hole 48 to permit gas to escape through the vent hole 48, reducing the gas pressure. Once the gas pressure is relieved, the disassembly can be completed without risk of personal injury.

The controlled pressure release 46 illustrated in FIG. 8 differs slightly from those shown in FIGS. 7 and 9. Instead of the sealing plug 60 being raised on the inside surfaces of either the guide plate 32 or the frame 36, the sealing plug 60 is disposed on the surface of a sealing member 62 that is independent of the guide plate 32 or the frame 36. This eliminates the need for prefabricating the sealing post 60 to be positioned for alignment with the vent hole 48. Rather, during assembly of the seatbelt pretensioner assembly 24, the sealing post 60 can be placed in the vent hole 48 before it is sandwiched between the elongate body 34 and the guide plate 32 (as shown in FIG. 8) or the frame 36 (not shown). Then the pretensioner cover 30 can be secured to the frame 36 to tightly sandwich the guide plate 30, the sealing member 62, and the elongate body 34 between the pretensioner cover 30 and the frame 36 so that the post 60 seals the vent hole 48 before and during deployment. However, after deployment of the pretensioner, frequently the seatbelt pretensioner assembly 24 must be replaced, which often requires disassembly of the seatbelt pretensioner assembly 24. If there is pent up gas pressure within the elongate body 34, this pressure can be relieved by loosening the pretensioner cover 30 and allowing the sealing member 62 and its sealing plug 60 to dislodge from the vent hole 48 to permit gas to escape through the vent hole 48, reducing the gas pressure. Once the gas pressure is relieved, the disassembly can be completed without risk of personal injury.

In operation, the seatbelt pretensioner assembly 24 of the various embodiments disclosed herein can retract the seatbelt webbing 18 in response to a deployment event and release gas pressure created by the deployment of the seatbelt pretensioner. When a deployment event (such as a collision) occurs, the deployment event is sensed and the igniter 38 is actuated to generate gas that produces gas pressure within the chamber 40 of the elongate body 34. This gas pressure moves the piston 42 within the elongate body 34, and because the seatbelt webbing 18 is connected to the piston 42 any slack in the webbing 18 is reduced by retracting the seatbelt webbing 18. This retraction is caused by the movement of the piston 42. Depending upon which controlled pressure release 46 is employed in the seatbelt pretensioner assembly 24, gas pressure relief within the seatbelt pretensioner assembly 24 occurs during and/or after deployment by allowing gas to escape through the vent hole(s) 48.

If the seatbelt pretensioner assembly 24 has a porous intermediate 50 (such as a porous ring 51) disposed between the generated gas and the vent hole(s) 48 or the space outside the vent hole(s) 48, then relieving gas pressure occurs by dissipating the gas pressure by enabling gas to pass through the porous intermediate 50 and then through the vent hole(s) 48. If the piston 42 has at least a portion made of a porous material 52, then relieving gas pressure occurs by dissipating gas pressure by enabling gas to pass through the porous material 52 and then through the vent hole(s) 48 or out an open end 54 in the elongate body 34. If the piston 42 further comprises a safety valve 58, then relieving gas pressure occurs by releasing gas through the safety valve 58 for venting from the elongate body 34 when the pressure of the gas generated exceeds the pressure required to move the piston 42 to its full extent.

During disassembly after deployment, any pent up gas pressure can be relieved by loosening the pretensioner assembly sufficiently to release the sealing plug(s) 60 from the vent hole(s) 48 so that gas is allowed to escape through the vent hole(s) 48.

As described and contemplated by the disclosure, the present invention may be embodied in various combinations and other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A seatbelt pretensioner for reducing slack in seatbelt webbing upon deployment in response to a triggering event, the pretensioner comprising:
    an igniter that generates gas in response to the triggering event;
    an elongate body defining a chamber for receiving and confining gas generated by the igniter, the elongate body has a vent hole and a plug sealing the vent hole, the plug being retractable from the vent hole, the plug is disposed on a frame and retracts from the vent hole to unseal the vent hole when the frame is loosened during disassembly of the pretensioner after deployment;
    a piston movable within the elongate body by the gas generated;
    a slack-reducing assembly that responds to movement of the piston and is connected to at least a portion of seatbelt webbing, movement of the piston causes the slack-reducing assembly to move the seat belt webbing reducing slack in the seatbelt webbing; and
    a controlled pressure release that enables gas to escape from the elongate body after deployment, relieving gas pressure within the pretensioner.

2. A seatbelt pretensioner as recited in claim 1, wherein the controlled pressure release causes gas pressure to dissipate within the pretensioner after deployment.

3. A seatbelt pretensioner as recited in claim 1, wherein the controlled pressure release comprises a vent hole in the elongate body and a porous intermediate disposed between the vent hole and the gas within the elongate body.

4. A seatbelt pretensioner as recited in claim 3, wherein the porous intermediate comprises a porous ring disposed abutting an internal surface of the elongate body.

5. A seatbelt pretensioner as recited in claim 4, wherein the porous ring is press fit into the elongate body.

6. A seatbelt pretensioner as recited in claim 1, wherein the piston comprises a porous portion.

7. A seatbelt pretensioner as recited in claim 6, wherein the piston comprises an overmold at least partially surrounding the porous portion.

8. A seatbelt pretensioner as recited in claim 6, wherein the piston further comprises a safety valve that releases gas for venting from the elongate body when the pressure of the gas generated exceeds the pressure required to move the piston to its full extent.

9. A seatbelt pretensioner as recited in claim 1, where the slack-reducing assembly comprises a cable connected to the piston and the seatbelt webbing.

10. A seatbelt pretensioner for reducing slack in seatbelt webbing upon deployment in response to a triggering event, the pretensioner comprising:

- an igniter that generates gas in response to the triggering event;
- an elongate body defining a chamber for receiving and confining gas generated by the igniter, the elongate body has a vent hole;
- a piston movable within the elongate body by the gas generated;
- a slack-reducing assembly that responds to movement of the piston and is connected to at least a portion of seatbelt webbing, movement of the piston causes the slack-reducing assembly to move the seat belt webbing reducing slack in the seatbelt webbing;
- a controlled pressure release that enables gas to escape from the elongate body after deployment, relieving gas pressure within the pretensioner, the controlled pressure release causes gas pressure to dissipate within the pretensioner after deployment; and
- a plug for sealing the vent hole, the plug being disposed on at least one of either a guide plate or a frame, the plug retracts from the vent hole to unseal the vent hole when at least one of the guide plate or the frame is loosened during disassembly of the pretensioner after deployment.

* * * * *